J. F. HADDAN.
GUANO DISTRIBUTER, COTTON PLANTER, OAT DRILL, HARROW, AND CULTIVATOR.
APPLICATION FILED DEC. 18, 1912.
1,118,279.
Patented Nov. 24, 1914.
2 SHEETS—SHEET 1.
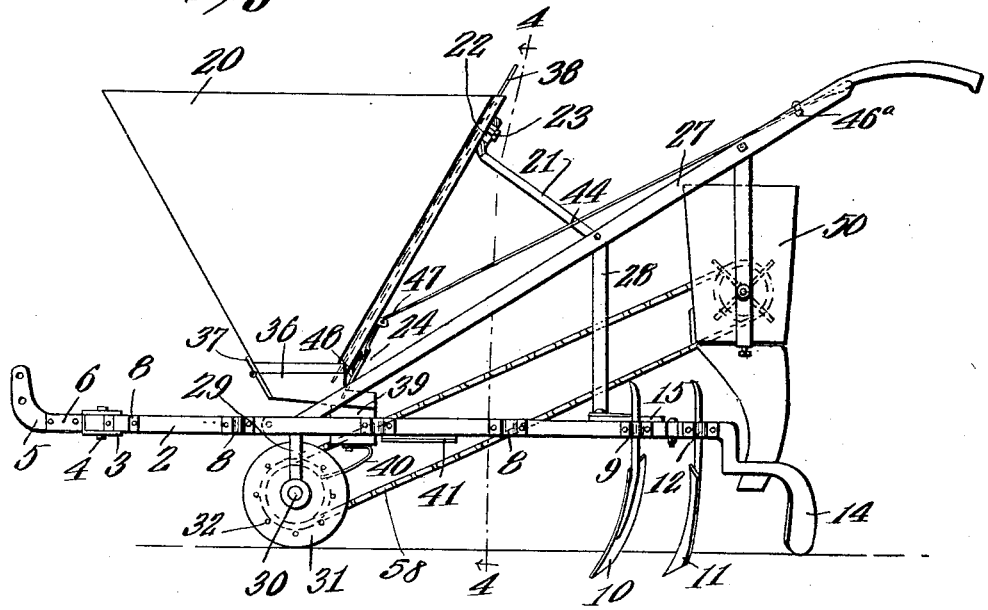
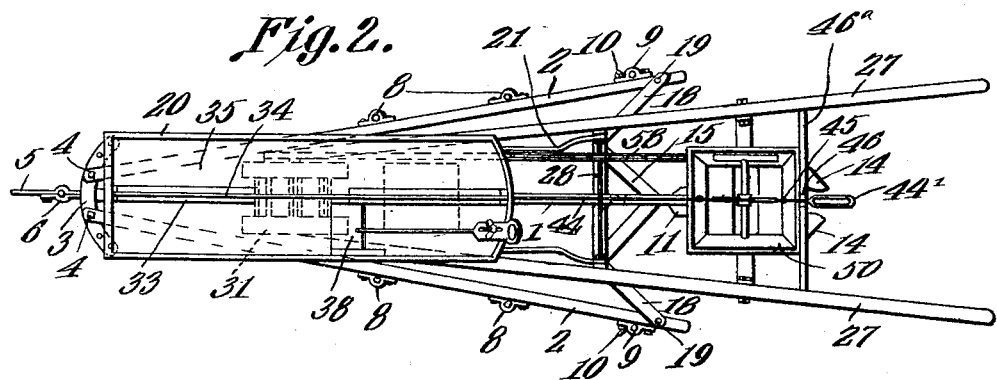
J. F. Haddan,
Inventor
Witnesses
by C. A. Snow & Co.
Attorneys

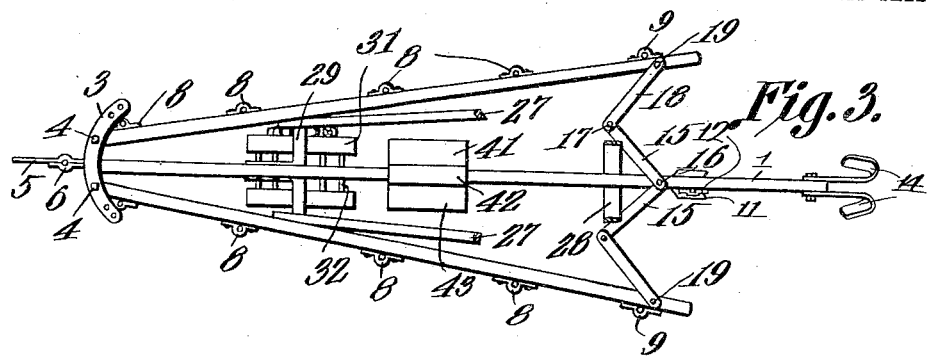

UNITED STATES PATENT OFFICE.

JAMES F. HADDAN, OF DOERUN, GEORGIA.

GUANO-DISTRIBUTER, COTTON-PLANTER, OAT-DRILL, HARROW, AND CULTIVATOR.

1,118,279. Specification of Letters Patent. Patented Nov. 24, 1914.

Application filed December 18, 1912. Serial No. 737,534.

*To all whom it may concern:*

Be it known that I, JAMES F. HADDAN, a citizen of the United States, residing at Doerun, in the county of Colquitt and State of Georgia, have invented a new and useful Guano - Distributer, Cotton - Planter, Oat-Drill, Harrow, and Cultivator, of which the following is a specification.

The device herein disclosed is adapted to be employed for applying guano and the like to the soil, and for the purpose of sowing oats, and for planting cotton seed.

The invention aims to provide novel means for actuating the mechanism whereby the guano and the seed are distributed, to provide novel means for actuating the agitating elements which operate in the cotton seed receptacle; to provide novel means for connecting the hopper adjustably with the supporting frame, and to improve generally, devices of that type to which the present invention appertains.

The invention aims further, to provide a single implement which may be employed as a cultivator, as a guano distributer, and for the simultaneous fertilization of the soil and distribution of seeds.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 shows the invention in elevation; Fig. 2 is a top plan; Fig. 3 is top plan, parts being removed; Fig. 4 is a transverse section on the line 4—4 of Fig. 1, frame parts being omitted; Fig. 5 is a vertical transverse section of the hopper; Fig. 6 is a perspective of the deflector; Fig. 7 is a fragmental top plan, showing sundry elements obscured in Fig. 2; and Fig. 8 is a detail perspective view illustrating the means whereby the hopper is supported.

In carrying out the invention there is provided a supporting structure, the same comprising a central bar 1 and diverging side bars 2, the forward end of the central bar 1 being secured to a transverse head 3, and the forward extremities of the side bars 2 being pivotally connected with the head 3, as indicated at 4. The head 3 is equipped with a suitable appliance 5 whereby the implement may be connected with a draft tree, and in the element 5 there is a socket 6 which may be employed to receive a shovel plow. Located along the side bars 2 at spaced points are a plurality of sockets 8, adapted, also, to receive shovel plows or like elements, when the supporting structure under consideration is employed as a cultivator. The rearmost sockets upon the side bars 2 are denoted by the numerals 9, the sockets 9 receiving shovel plows 10, having functions which will be set forth hereinafter. A shovel plow 11 is secured to the central bar 1, adjacent the rear end thereof, the plow 11 being mounted in the socket 12. Connected to the extreme rear end of the central bar 1, are spaced, resilient covering members 14. The adjacent end of links 15 are pivotally united as indicated at 16 with the central bar 1, the outer or remote ends of the links 16 being pivotally connected as indicated at 17, with the inner ends of the links 18, the outer ends of which are pivotally connected as indicated at 19 with the side bars 2, thus defining a lazy-tongs connection, whereby the rear ends of the side bars 2 may be moved toward and away from the rear end of the central bar 1, thereby to lessen and to increase the width of the zone which is swept. At this point it may be stated that the device as hereinbefore disclosed is adapted to be employed as a cultivator, it being possible to remove the elements hereinafter described, in order that the cultivator proper may be unencumbered, during its operation. In carrying out the invention, however, there is provided a frusto-pyramidal hopper 20, supported by brackets 21, (see Fig. 4) the brackets 21 having elongated slots 22 at their upper ends, receiving securing elements 23. Another bracket 24 is shown, the same having a slot 25, receiving a securing element 26, the construction being such, obviously, that the hopper 20 may be adjusted vertically in the brackets 21 and 24. The lower ends of the brackets 21 and 24 are assembled with the handles 27 of the cultivator. The handles 27, are supported intermediate their ends by a Y-shape brace 28, the lower end of which is secured to the central bar 1. The forward ends of the handles 27 may be connected with the bearing brackets 29, secured to the central bar 1, the bearing bracket 29 depending below the bar 1 and 2. Journaled for rotation in the bracket 29 is a shaft 30 carrying wheels 31, united by a plurality of pins 32, the pins 32 being located in a circle.

The hopper 20 is equipped with upright spaced ribs 33, receiving removably a partition 34, defining compartments 35 in the hopper. The invention further includes a chute 36, united at its forward end by means of hinges 37 of any desired construction, with the hopper 20. One of the compartments 35 is adapted to contain guano or another fertilizer, the other of the compartments 35 being adapted to receive oats or any other grain which is to be sowed. In order to control the outflow of the grain from the last mentioned compartment 35, a paddle 38 is mounted to slide therein, the lower end of the paddle regulating the outflow of the grain from the chute 36. The chute 36 is equipped with a depending extension 39, supporting a forwardly extended, curved arm 40, adapted to be engaged successively by the pins 32 which connect the wheels. The wheels 31 are rotated through their engagement with the ground, when the machine is advanced. Mounted upon the central bar 1, to the rear of the chute 36 and below the discharge end of the same, is a deflector, shown most clearly in Fig. 6, and denoted generally by the numeral 41. The deflector 41 may be of any desired form, but it is shown as comprising a central trough-shaped portion 42, having laterally projecting, spreading wings 43. Extending longitudinally of the machine is a flexible element 44, provided at its rear end with a handle 44' and equipped, in front of the handle 44' with a projection 45, adapted to be engaged by a catch 46 supported by a brace 46ª which connects the handles 27. The flexible element 44 extends forwardly and downwardly, through a support 47 secured to the rear face of the hopper 20, the lower forward end of the flexible element 44 being connected with a yoke 48 which is pivoted in the rear portion of the chute 36.

A seed receptacle 50 may be combined with the mechanism above described, the agitating mechanism of the receptacle 50 being operatively connected by any suitable means indicated conventionally at 58, with the ground wheel 31.

The practical operation of the device hereinbefore described is as follows:—In one of the compartments 35 of the hopper 20 is placed guano or another fertilizer, oats or the like being placed in the other compartments 35. When the machine is advanced over the ground, rotatory movement will be imparted to the wheels 31, the pins 32 of which will strike the arm 40 of the chute 36, and impart a reciprocating motion to the chute 36, whereby the grain and guano, entering the chute 36 from the hopper 20, will be disposed upon the ground. As hereinbefore stated, the flow of the material from one of the compartments 35 may be adjusted by altering the position of the paddle 38. At times it is desirable that no material should be deposited upon the ground from the chute 36, notably when the implement is rounding a stump, or is at the end of a row. Under such circumstances, the flexible element 44 may be drawn upon, until the projection 45 therein engages with the bracket 46. Under such circumstances, the rear end of the chute 36 will be elevated, so that the arm 40 no longer engages with the pins 32 of the wheels 31. When the parts are positioned as above described, the wheels 31 may rotate freely, without imparting reciprocatory movement to the chute 36, and consequently, the contents of the hopper 20 will not be deposited. The deflector 41 shown in Fig. 6 is a useful but not absolutely necessary element. When the deflector 41 is employed, it will be understood that the contents of the hopper 20 will be discharged into the chute 36, and from the chute 36 upon the wings 43 of the deflector 41, the contents of the hopper being thus carried laterally.

Having thus described the invention what is claimed is:—

1. In a device of the class described, a supporting structure; a hopper; a chute pivoted to the hopper; a ground wheel journaled for rotation upon the supporting structure and provided with projections; an arm upon the chute, adapted to engage the projections; means for connecting the hopper with the supporting structure, whereby the hopper may be adjusted vertically, to adjust the relative positions of the arm and the projections; and means connected with the chute for elevating the chute and for holding the arm out of engagement with the projections.

2. In a device of the class described, a supporting structure; a hopper; a chute pivoted to the hopper; a ground wheel journaled on the supporting structure and coacting with the chute to reciprocate the same; means for connecting the hopper with the supporting structure to raise and lower the hopper and the chute together; and means connected with the chute for raising and lowering the chute independently of the hopper, thereby to adjust the position of the chute with respect to the ground wheel.

3. In a device of the class described, a supporting structure; a hopper; a chute pivoted to the hopper; a ground wheel journaled on the supporting structure and cooperating with the chute to reciprocate the same; means for connecting the hopper with the supporting structure to raise and lower the hopper and the chute together; a deflector carried by the supporting structure and adapted to receive material from the chute; and means connected with the chute for raising and lowering the chute independently of the hopper, thereby to adjust the position of the chute with respect to the ground wheel and to adjust the position of the chute with respect to the deflector.

4. In a device of the class described, a supporting structure; a hopper; a chute pivoted to the hopper; a ground wheel journaled on the supporting structure and cooperating with the chute to reciprocate the same; means for connecting the hopper with the supporting structure to raise and lower the hopper and the chute together; a deflector mounted on the supporting structure; and means connected with the chute for raising and lowering the chute independently of the hopper, thereby to adjust the position of the chute with respect to the deflector.

5. In a device of the class described, a supporting structure including a beam; a deflector connected with the beam and including wings extended upon either side of the beam; a hopper carried by the supporting structure; a movable chute adapted to receive material from the hopper and to discharge the same upon the deflector; and means for moving the chute.

In testimony that I claim the foregoing as my own, I have hereto affixed my signature in the presence of two witnesses.

JAMES F. HADDAN.

Witnesses:
 M. G. WELLS,
 W. M. SMITH.

Copies of this patent may be obtained for five cents each, by addressing the "Commissioner of Patents, Washington, D. C."